United States Patent [19]
Sugita

[11] Patent Number: 5,490,792
[45] Date of Patent: Feb. 13, 1996

[54] MULTI-LEVEL MEMORY CARD CONNECTOR

[75] Inventor: Naoki Sugita, Kawasaki, Japan

[73] Assignee: Kel Corporation, Tokyo, Japan

[21] Appl. No.: 150,473

[22] Filed: Nov. 12, 1993

[30] Foreign Application Priority Data

Nov. 18, 1992 [JP] Japan ................. 4-085493 U

[51] Int. Cl.⁶ .................................................. H01R 13/62
[52] U.S. Cl. ................... 439/159; 439/160; 439/540.1
[58] Field of Search ................................... 439/159, 160, 439/540, 540.1, 152, 64

[56] References Cited

U.S. PATENT DOCUMENTS

| | | | |
|---|---|---|---|
| 4,952,161 | 8/1990 | Komatsu | 439/159 X |
| 5,139,435 | 8/1992 | Komatsu et al. | 439/159 |
| 5,281,157 | 1/1994 | Abe et al. | 439/159 |
| 5,286,214 | 2/1994 | Takahashi | 439/159 |
| 5,299,946 | 4/1994 | Kusakabe | 439/159 |
| 5,324,204 | 6/1994 | Lwee | 439/159 X |

*Primary Examiner*—Larry I. Schwartz
*Assistant Examiner*—Daniel Wittels
*Attorney, Agent, or Firm*—Robert W. J. Usher

[57] ABSTRACT

A multi-level memory card connector has a plurality of memory card receiving compartments located in vertical alignment with each other at upper and lower levels and memory card ejection mechanisms at the sides of respective compartment also in vertical alignment. Ejection buttons for actuating respective ejection mechanisms are exposed to a memory card insertion face at upper and lower levels but are laterally offset to reduce the risk of the operators finger inadvertently pressing two adjacent buttons simultaneously.

3 Claims, 5 Drawing Sheets

MULTI-LEVEL MEMORY CARD CONNECTOR

FIELD OF THE INVENTION

The invention relates to a multi-level memory card connector.

BACKGROUND OF THE INVENTION

Memory cards which are of approximately credit or calling card size are being increasingly adopted particularly for use in electronic notebooks and computers of the laptop and notebook type to meet the inexorable demand for the inherently conflicting requirements of compactness and high power.

Examples of memory card connectors are described in application 07/996895 of Takahashi, filed Dec. 28, 1992, Japanese utility model publication 3-38772 and U.S. Pat. No. 5,026,296, the disclosures of which are incorporated herein by reference.

Such connectors comprise a memory card receiving compartment with a memory card receiving mouth opening at an insertion face; ejection means for ejecting a memory card from the compartment including an ejection button mounted on the insertion face at a location laterally of the mouth for actuating the ejection means.

A plurality of such connectors are desirably located one above the other with respective memory card receiving compartments and ejection mechanisms in vertical alignment enabling standard components to be used in each minimizing the inventory and manufacturing particularly capital equipment (tooling) to minimize the costs of mass production, as necessary to compete in the world marketplace.

However, the problem arises of maintaining the compartments in close proximity for maximum compactness and, so far as possible, the use of identical components for the operated mechanisms of each while obviating or minimizing risk of inadvertent depression of adjacent ejection buttons.

SUMMARY OF THE INVENTION

An object of the invention is to provide a multi-level memory card connector in which the risk of inadvertent depression of adjacent buttons is obviated while maintaining the utilization of identical components at a maximum.

According to one aspect of the invention, there is provided a multi-level memory card connector comprising frame means defining a plurality of memory card receiving compartments located extending horizontally and in vertical alignment at upper and lower levels and having respective memory card receiving mouths opening at a common insertion face; a plurality of ejection means for ejecting respective memory cards from respective compartments and mounted in the frame means at locations laterally adjacent respective compartments and in vertical alignment with each other; a plurality of ejection buttons for actuating respective ejection means and mounted on the insertion face at locations at respective levels laterally of respective mouths, the ejection buttons being laterally offset from each other so that they extend obliquely of the vertical.

Thus, only the button positions need be changed, the remaining components can often be of identical construction for each compartment.

Preferably, the ejection means include respective actuating members having respective end portions having equal lateral widths and located at the insertion face and carrying respective ejection buttons which have lateral widths of one half the lateral widths of respective actuating members.

According to another aspect of the invention, there is provided a lap top computer having a housing with an upper horizontal operating face and a vertical front face and side faces extending downward and rearward from the upper and front faces, respectively, in opposed relation and a multi-level memory card connector comprising frame means defining a plurality of memory card receiving compartments located extending parallel to the operating face and in vertical alignment as upper and lower levels and having respective memory card receiving mouths opening at a common insertion face; a plurality of ejection means for ejecting respective memory cards from respective compartments and mounted in the frame means at locations laterally adjacent respective compartments and in vertical alignment; a plurality of ejection buttons for actuating respective ejection means and mounted on the insertion face at locations at respective levels laterally of respective mouths, the ejection buttons being laterally offset from each other so that they extend obliquely of the vertical, the insertion face extending along a side face and the button at the lower level being located closer to the front face than the button at the upper level so that an operator's finger extended downwards to release a memory card from a compartment at the lower level by depression of the button at that level will not extend across the button at the upper level.

BRIEF INTRODUCTION TO THE DRAWINGS

Embodiments of the invention will now be described with reference to the accompanying drawings in which.

DESCRIPTION OF PARTICULAR EMBODIMENTS

Figure 1:
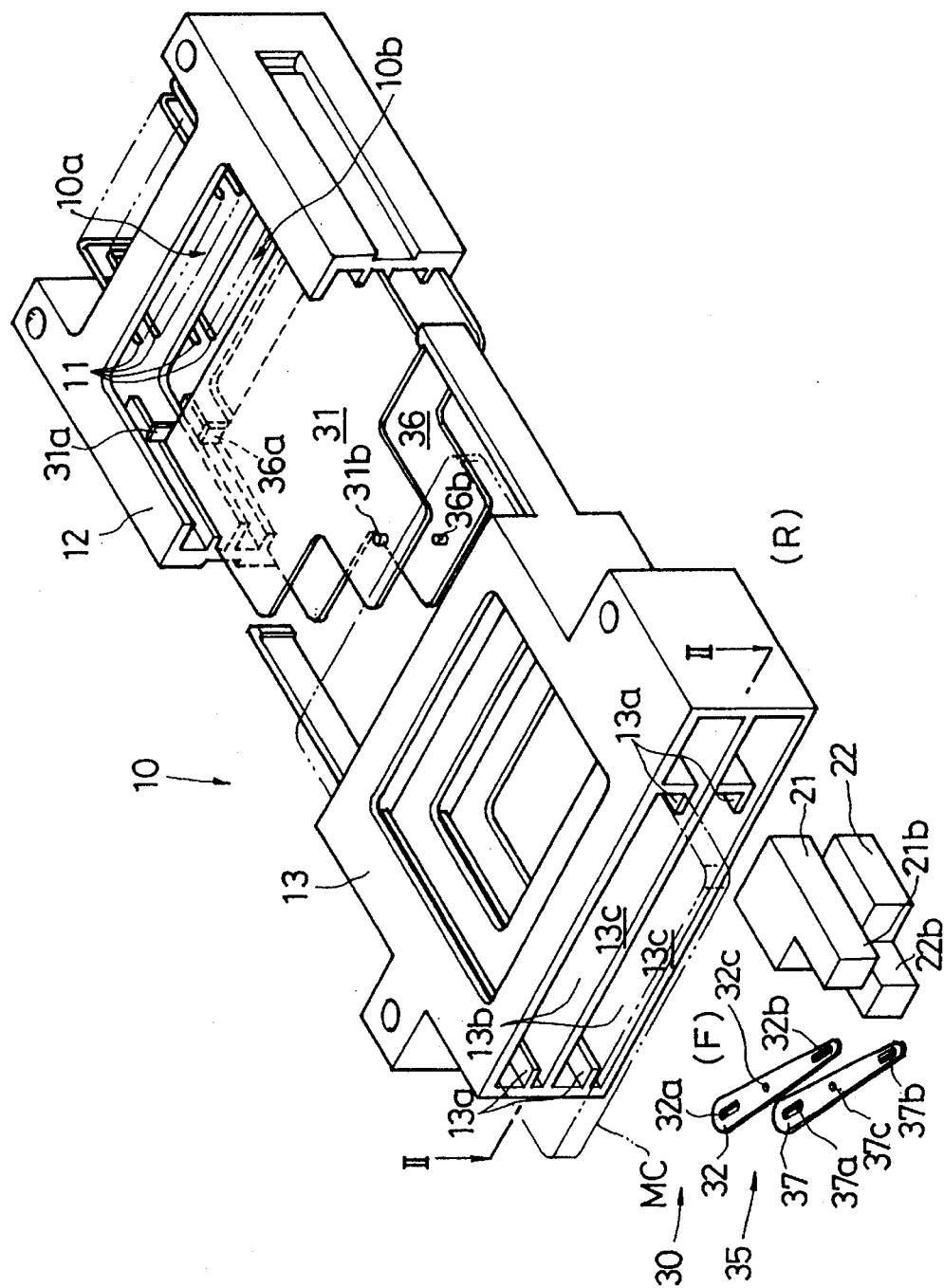
FIG. 1 is an exploded perspective view of a first embodiment of multi-level connector for memory cards.
Figure 2:
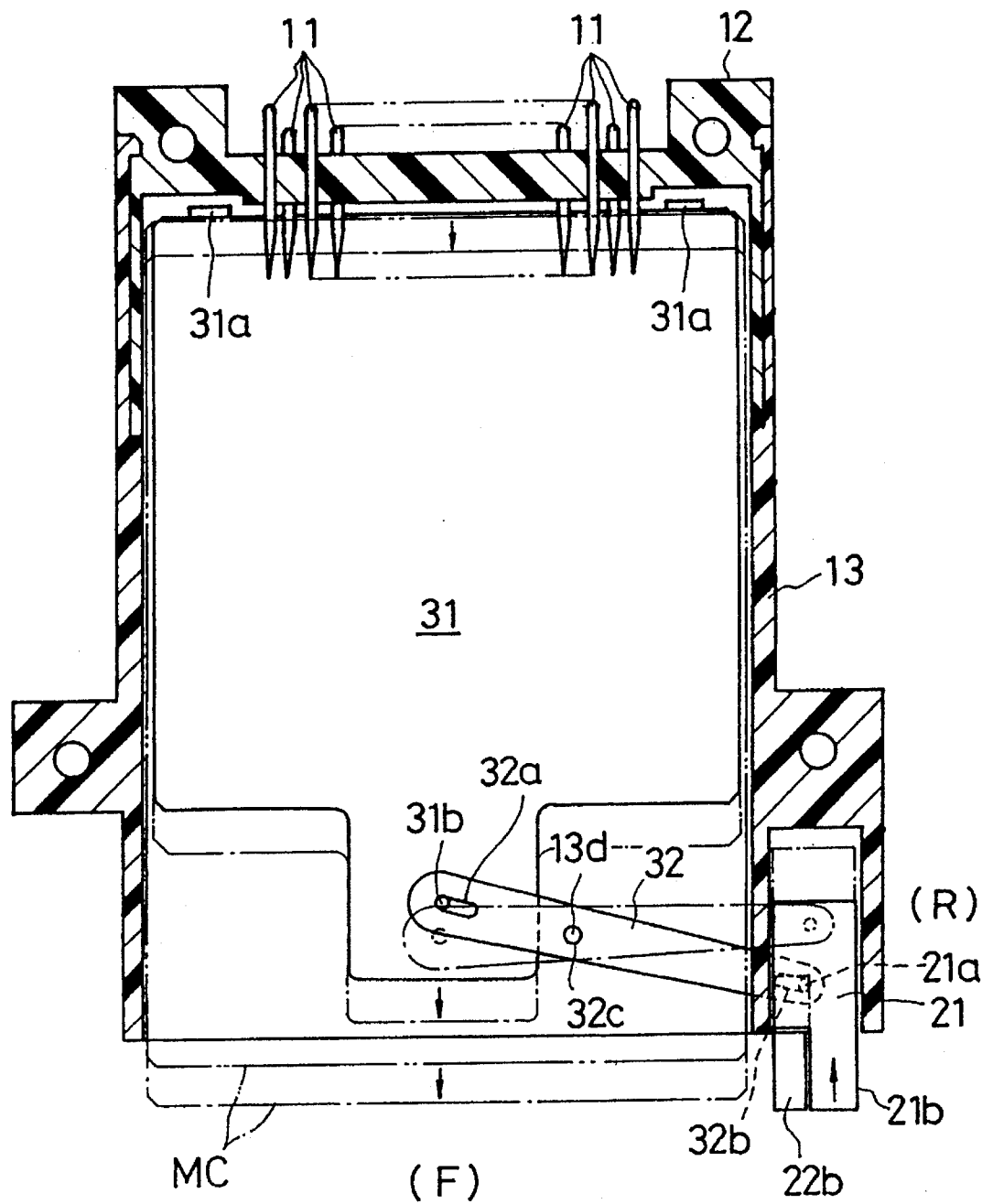
FIG. 2 is a cross sectional view along line II—II in FIG. 1.

As shown particularly in FIGS. 1 and 2, a two-level memory card connector 10 has a rear, retaining frame 12 comprising upper and lower connecting parts 10a and 10b, respectively, in which upper and lower series of contact pins 11 are retained by insert molding. Rear, lower ends of the contact pins 11 are connected by soldering to conducting paths of a printed circuit board (not shown). A guide frame 13 defines upper and lower memory card receiving compartments 13b having respective floors 13c and memory card guiding rails 13a extending rearward from respective Memory card receiving mouths which open at a common memory card insertion face F. The guide frame 13 is connected to a front end of the retaining frame 12 with the respective compartments aligned with respective series of contact pins 11.

Upper and lower actuating members 21 and 22 are received in vertical alignment for sliding movement in the insertion direction in cavities formed on the right hand sides of respective compartments and have ejection buttons 21b and 22b which protrude from the insertion face. The ejection buttons have rectangular faces with respective widths of approximately one of the total widths of the respective actuating members while the lateral offset locates them in substantially diagonal relation. Upper and lower ejection mechanisms 30 and 35, respectively, are mounted in the frame 13, one above the other at respective levels and comprise, respectively, memory card extraction plates 31 and 36, respectively, and operating levers 32 and 37.

Memory card engaging hooks 31a and 36a upstand from respective extraction plates at left and right sides of rear end portions thereof and cylindrical pivot pins 31b and 36b upstand from central locations at respective front ends thereof. The extraction plates 31 and 36 are mounted under respective guide rails 13a for free sliding movement back and forth by the operating levers 32 and 37 during insertion and removal of memory cards.

The operating levers 32 and 37 have slots 32a and 32b and 37a and 37b, respectively, formed in respective opposite ends thereof, receiving respectively, pins 31b and 36b of respective extraction plates, and pins 21a and 22a provided on actuating members 21 and 22, respectively. Circular apertures 32c and 37c are formed to the left of center on respective levers 32 and 37 for rotational receipt of the respective pivot pins 31b and 36b thereby operatively linking the respective extraction plates with respective actuating members for operation by respective ejection buttons 21b and 22b.

Thus, when a memory card MC is inserted through the upper mouth into the upper compartment 13b, the leading edge of the card engages respective hooks of the extraction plate 31 forcing the plate rearward, rotating lever 32 in a clockwise direction and projected actuating member 21a and ejection button 21b forwards to protrude from the insertion face until the contact pins are received in respective sockets (not shown) at the leading end of the memory card thereby reliably connecting the memory card to the circuit board. Depression of the ejection button 21b causes the actuating member 21 to pivot the lever 32 in an opposite, counterclockwise direction, moving the extraction plate 31 forwards, withdrawing the sockets from the pins, electrically disconnecting the card from the circuit board and carrying the memory card towards the insertion face until a trailing end thereof protrudes from the mouth at the insertion face permitting the card to be removed from the compartment by hand. Insertion and removal of a memory card from the lower compartment is carried out in an analogous fashion. As a result of the ejection buttons associated with the upper and lower compartments being laterally offset from each other, there is less risk of the operator inadvertently pushing also the other button and thereby ejecting the other memory card at the same time.

Figure 3:
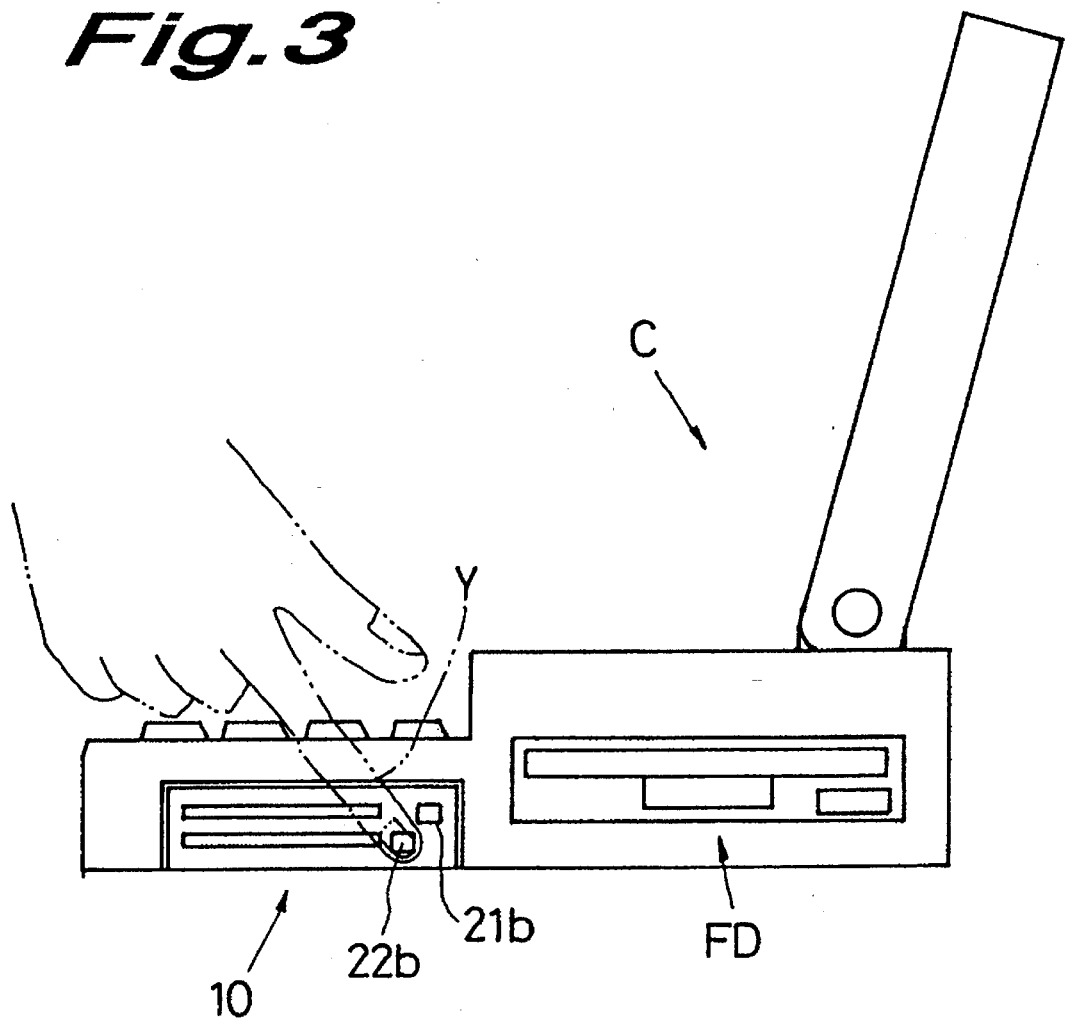
FIG. 3 is a side elevation of a lap top computer in which the aforementioned connector has been installed.

As shown in FIG. 3, when the memory card connector 10 is installed adjacent the front of a lap top computer C containing a floppy disk drive FD, it is desirable for the uppermost ejection button 21b to be placed rearward (to the right in the figure) relative to the lowermost ejection button 22b so that a finger Y of an operator attempting to press only the lower ejection button extending from the top of the front side of the computer C, does not overlie and therefore tends not to interfere with the other ejection button obviating the risk of inadvertent simultaneous depression of both buttons.

If the actuating members were similarly located, laterally displaced, in their entirety instead of merely the front portions forming the ejections buttons the entirety of the upper and lower eject mechanisms could not be of identical construction. In contrast, if only the front parts 21b and 22b are so staggered, the ejection mechanism 30 and the ejection mechanism 35 can be made entirely identical merely by reversing the directions in which the actuating members 21 and 22 are inserted into the insertion frame 13. (However, the pins 21a and 22a must be on both the upper and lower surfaces of the eject buttons 21 and 22).

Figure 4:
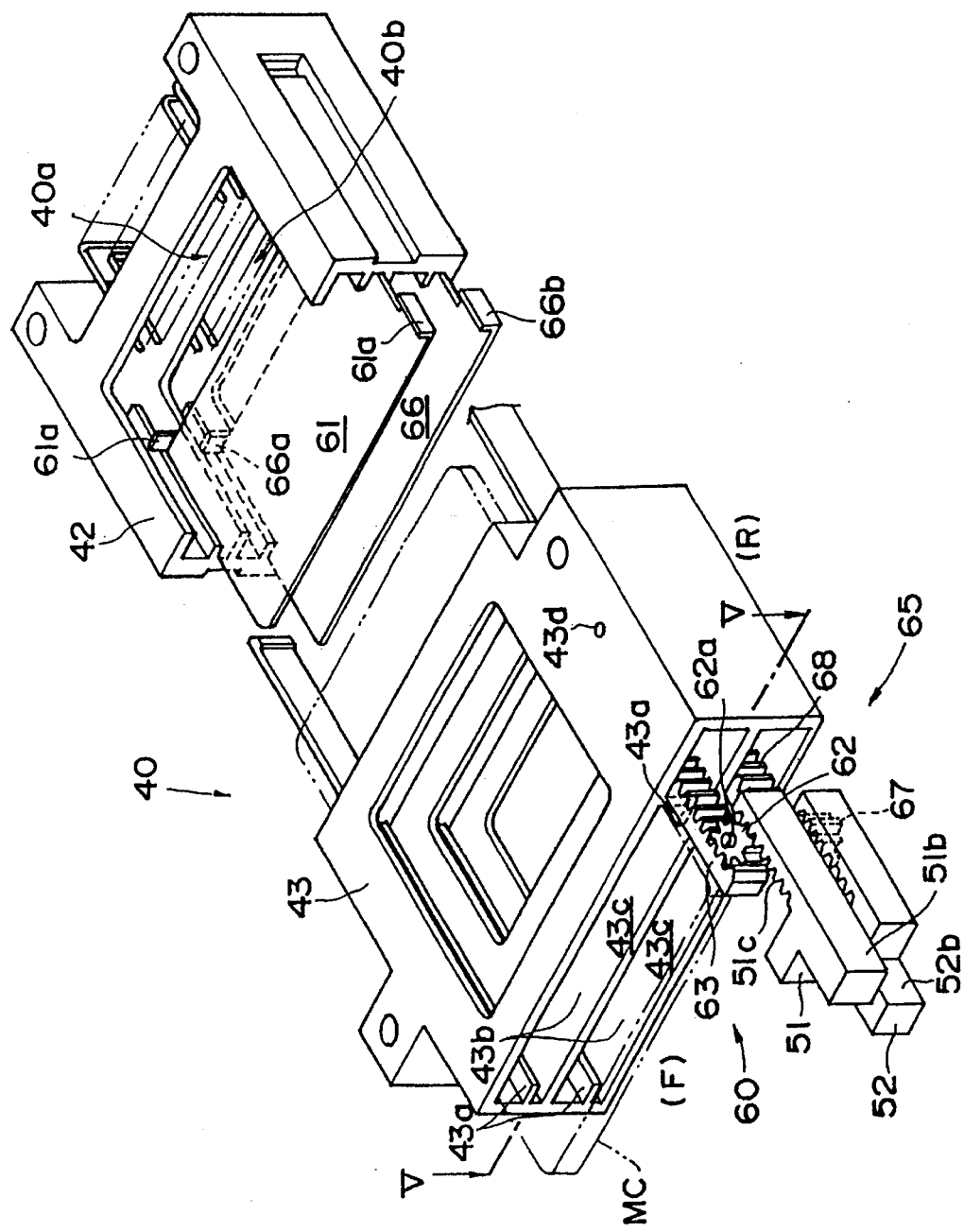
FIG. 4 is an exploded perspective view of a second embodiment of a multi-level connector for memory cards; and, FIG. 5 is a cross-sectional view along line V—V in FIG. 4.
Figure 5:
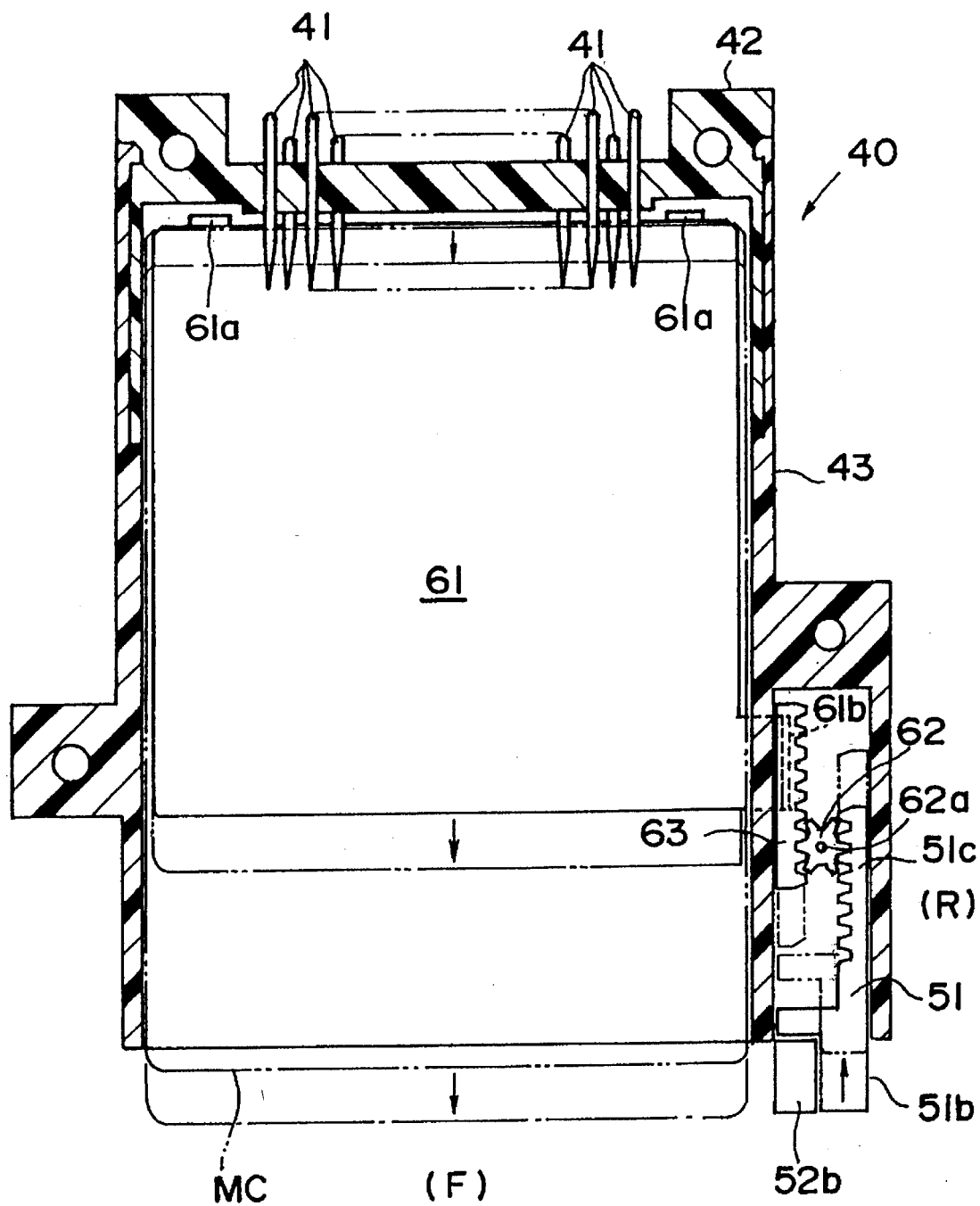

As shown particularly in FIGS. 4 and 5, a second embodiment of two-level memory card connector 40 has a rear, retaining frame 42, of substantially identical construction to that of the first embodiment and comprising upper and lower connecting parts 40a and 40b, respectively, in which upper and lower series of contact pins 41 are retained by insert molding. Rear, lower ends of the contact pins 41 are connected by soldering to conducting paths of a printed circuit board (not shown). A guide frame 43, also of similar construction to that of the first embodiment, defines upper and lower memory card receiving compartments 43b having respective floors 43c and memory card guiding rails 43a extending rearward from respective memory card receiving mouths which open at a common memory card insertion face F. The guide frame 43 is connected to a front end of the retaining frame 42 with the respective compartments aligned with respective series of contact pins 41.

Upper and lower actuating members 51 and 52 are received in vertical alignment for sliding movement in the insertion direction in cavities formed on the right hand sides of respective compartments and have ejection buttons 51b and 52b protruding from the insertion face. The ejection buttons 51b and 52b extend for only part of the width of respective actuating members and are laterally misaligned or offset from each other so that they lie on a diagonal in the same sense as in the first embodiment.

Upper and lower ejection mechanisms 60 and 65, respectively, are mounted in the frame 43, one above the other at respective levels and comprise, respectively, memory card extraction plates 61 and 66, respectively, having memory card engaging hooks 61a and 66a upstanding from respective extraction plates at left and right sides of rear end portions and thereof and flanges 61a and 66b which upstand from lateral edges; pinions 62 and 67 rotatively mounted on pivot pin 62a mounted in vertically aligned apertures 43d formed in the right upper wall and floors 43c of the guide frame and which meshes with rack teeth formed on respective actuating members and with teeth of racks 63 and 68 linked to the respective extraction plates by slots receiving the flanges 61a and 66b in generally similar fashion to the construction described in the above-mentioned application.

Memory card engaging hooks 61a and 66a upstand from respective extraction plates at left and right sides of rear end portions, thereof and cylindrical pivot pins 61b and 66b upstand from central locations at respective front ends thereof. The extraction plates 61 and 66 are mounted under respective guide rails 16a for free sliding movement back and forth by the operating levers 32 and 37 during insertion and removal of memory cards.

Insertion of a memory card MC through the upper mouth into the upper compartment 43b, brings the leading edge of the card into engagement with respective hooks of the extraction plate 61, forcing the plate rearward, drawing rack 63 towards the connector rear until the contact pins are fully received in the sockets on the leading end of the memory card and rotating the pinion clockwise which advances the actuating member and button 51b to protrude further from the insertion face. Depression of the button causes the racks and pinion to move in the reverse direction with the extraction plate disconnecting the memory card from the contact pins from the contact pins and withdrawing it from the compartment until a rear end protrudes sufficiently from the insertion face to be gripped and removed by an operators hand.

Insertion and removal of a memory card from the lower compartment may of course be carried out in an analogous fashion.

As before, as a result of the ejection buttons associated with the upper and lower compartments being laterally offset from each other, there is less risk of the operator inadvertently pushing also the other button and thereby ejecting the other memory card simultaneously. At the same time, with the exception of the buttons carried by the ends of the actuating members, the entire ejection mechanisms for each level can be identical, minimizing inventory and manufacturing costs.

Although the invention has been described specifically only in relation to a two-level connector, embodiments with memory card receiving compartments located on three or more levels are possible.

I claim:

1. A multi-level memory card connector comprising:

frame means defining a plurality of memory card receiving compartments located adjacent each other extending horizontally and in vertical alignment at upper and lower levels and having respective horizontally elongate memory card receiving mouths opening at a common insertion face;

a plurality of ejection means for ejecting respective memory cards from respective compartments and mounted in the frame means to extend at adjacent locations which locations are laterally adjacent respective compartments and in vertical alignment with each other;

a plurality of ejection buttons for actuating respective ejection means and mounted on the insertion face at adjacent locations at respective levels laterally of respective mouths, the ejection buttons having respective free ends with respective finger-engageable portions exposed at the insertion face at locations adjacent respective adjacent longitudinal ends of respective mouths and laterally offset from each other so that they extend obliquely of the vertical.

2. A multi-level memory card connector according to claim 1 wherein the ejection means include respective identical actuating members having respective end portions having equal lateral widths and located at the insertion face in precise vertical alignment and carrying respective ejection buttons the respective finger-engageable portions of which have lateral widths of one half the lateral widths of respective actuating members and are located at respective opposite lateral ends thereof.

3. A lap top computer having a housing with an upper horizontal operating face and a vertical front face and side faces extending downward and rearward from the upper and front faces, respectively, in opposed relation and a multi-level memory card connector comprising:

frame means defining a plurality of memory card receiving compartments located adjacent each other extending parallel to the operating face and in vertical alignment as upper and lower levels and having respective, horizontally elongate, memory card receiving mouths opening at a common insertion face;

a plurality of ejection means for ejecting respective memory cards from respective compartments and mounted in the frame means to extend at locations laterally adjacent respective compartments and in vertical alignment;

a plurality of ejection buttons for actuating respective ejection means and mounted on the insertion face to extend at adjacent locations at respective levels laterally of respective mouths, the ejection buttons having respective free ends with respective finger-engageable portions exposed at the insertion face at locations adjacent respective adjacent longitudinal ends of respective mouths and which finger-engageable portions are adjacent and laterally offset from each other so that they extend obliquely of the vertical, the insertion face extending along a side face and the finger-engageable portion of the button at the lower level being located closer to the front face than the finger-engageable portion of the button at the upper level so that an operator's finger extended downwards to release a memory card from a compartment at the lower level by depression of the finger-engageable portion of the button at that level will not extend across the finger-engageable portion of the button at the upper level.

* * * * *